US 8,254,626 B2

United States Patent
Takamori

(10) Patent No.: US 8,254,626 B2
(45) Date of Patent: Aug. 28, 2012

(54) OUTPUT APPARATUS, OUTPUT METHOD AND PROGRAM FOR OUTPUTTING A MOVING IMAGE INCLUDING A SYNTHESIZED IMAGE BY SUPERIMPOSING IMAGES

(75) Inventor: Tetsuya Takamori, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1140 days.

(21) Appl. No.: 11/961,693

(22) Filed: Dec. 20, 2007

(65) Prior Publication Data

US 2008/0152193 A1 Jun. 26, 2008

(30) Foreign Application Priority Data

Dec. 22, 2006 (JP) ................... 2006-346663
Dec. 14, 2007 (JP) ................... 2007-323647

(51) Int. Cl.
*G06K 9/00* (2006.01)
*G06K 9/36* (2006.01)
*H04N 7/18* (2006.01)
*H04N 5/33* (2006.01)
*G09G 5/00* (2006.01)

(52) U.S. Cl. ........ 382/103; 382/107; 382/284; 348/154; 348/155; 348/168; 345/629

(58) Field of Classification Search .................. None
See application file for complete search history.

(56) References Cited

U.S. PATENT DOCUMENTS

| | | | | |
|---|---|---|---|---|
| 6,310,987 B1 * | 10/2001 | Koyama | .................. | 382/307 |
| 6,459,808 B1 * | 10/2002 | Brand | .................. | 382/155 |
| 7,623,677 B2 * | 11/2009 | Girgensohn et al. | .......... | 382/103 |
| 2002/0041339 A1 * | 4/2002 | Diepold | ........................ | 348/700 |
| 2002/0181741 A1 * | 12/2002 | Masukura et al. | ............. | 382/103 |
| 2003/0184562 A1 * | 10/2003 | Matsumoto et al. | .......... | 345/620 |
| 2005/0111698 A1 * | 5/2005 | Kawai | ........................... | 382/103 |
| 2006/0062480 A1 * | 3/2006 | Fujiyama et al. | ............. | 382/232 |
| 2006/0204044 A1 * | 9/2006 | Takemoto et al. | ............. | 382/107 |
| 2007/0248244 A1 * | 10/2007 | Sato et al. | .................... | 382/103 |
| 2009/0208061 A1 * | 8/2009 | Matsumoto et al. | .......... | 382/107 |
| 2010/0128926 A1 * | 5/2010 | Iwasaki et al. | ................ | 382/103 |
| 2010/0238266 A1 * | 9/2010 | Jojic et al. | ....................... | 348/36 |

FOREIGN PATENT DOCUMENTS

JP 9-102910 A 4/1997
JP 2004-266376 A 9/2004

* cited by examiner

*Primary Examiner* — Randolph I Chu

(74) *Attorney, Agent, or Firm* — Birch, Stewart, Kolasch & Birch, LLP.

(57) ABSTRACT

An output apparatus includes a section that acquires a moving image, a section that extracts a moving object in the acquired moving image, a section that identifies an object area, which is an area occupied by the extracted object in each moving image component image in a plurality of moving image component images included in the acquired moving image, a section that selects a plurality of moving image component images in which the identified object areas are not in positions that overlap with one another from among the plurality of moving image component images included in the acquired moving image, a section that generates a single synthesized image by superimposing images that include a plurality of object areas included in each moving image component image in the plurality of moving image component images selected, and a section that outputs the generated synthesized image.

20 Claims, 11 Drawing Sheets

210

| SHAPE | COLOR | POSITION | DIRECTION | TYPE |
|---|---|---|---|---|
| SHAPE1 | COLOR RANGE1 | POSITION RANGE1 | ANGLE RANGE1 | TYPE1 |
| SHAPE2 | COLOR RANGE2 | POSITION RANGE2 | ANGLE RANGE2 | TYPE2 |
|  |  |  |  |  |
| SHAPEn | COLOR RANGEn | POSITION RANGEn | ANGLE RANGEn | TYPEn |

*FIG. 8*

OUTPUT APPARATUS, OUTPUT METHOD AND PROGRAM FOR OUTPUTTING A MOVING IMAGE INCLUDING A SYNTHESIZED IMAGE BY SUPERIMPOSING IMAGES

CROSS REFERENCE TO RELATED APPLICATION

The present application claims priority from a Japanese Patent Application(s) No. 2006-346663 filed on Dec. 22, 2006, and No. 2007-323647 filed on Dec. 14, 2007, the contents of which are incorporated herein by reference.

BACKGROUND

1. Technical Field

The present invention relates to an output apparatus, an output method, and a program and, more particularly, the present invention relates to an output apparatus, an output method, and a program used by the output apparatus for outputting a moving image.

2. Related Art

A video synthesizing apparatus that generates a trigger indicating importance of a video, calculates image structure using the generated trigger, creates an image used in synthesis of an input image based on a calculation result of the image structure, and synthesizes the input image and the synthesized image into a single image is known as, for example, in Japanese Patent Application Publication No. 2004-266376 (Patent Document 1).

Through the photographic device described in Patent Document 1, because the image to be synthesized is selected using a trigger that indicates importance of the video, there are problematic cases where trajectory of a person overlaps and becomes difficult to see.

SUMMARY

Therefore, it is an object of an aspect of the present invention to provide an output apparatus, an output method, and a program that are capable of overcoming the above drawbacks accompanying the related art. The above and other objects can be achieved by combinations described in the independent claims. The dependent claims define further advantageous and exemplary combinations of the present invention.

According to a first aspect related to the innovations herein, one exemplary apparatus may include an output apparatus. The output apparatus includes a moving image acquiring section that acquires a moving image, a moving object extracting section that extracts a moving object in the moving image acquired by the moving image acquiring section, an object area identifying section that identifies an object area, which is an area occupied by the object extracted by the moving object extracting section in each moving image component image in a plurality of moving image component images included in the moving image acquired by the moving image acquiring section, a moving image component image selecting section that selects a plurality of moving image component images in which the object areas identified by the object area identifying section are not in positions that overlap with one another from among the plurality of moving image component images included in the moving image acquired by the moving image acquiring section, an image generating section that generates a single synthesized image by superimposing images that include a plurality of object areas included in each moving image component image in the plurality of moving image component images selected by the moving image component image selecting section, and an output section that outputs the synthesized image generated by the image generating section.

The output apparatus may further include a moving direction identifying section that identifies a direction in which the object extracted by the moving object extracting section moves in the moving image acquired by the moving image acquiring section and a period identifying section that identifies a period in which an amount of change in a direction identified by the moving direction identifying section is less than a predetermined amount of change in the moving image acquired by the moving image acquiring section. In the output apparatus, the moving image component image selecting section may select a plurality of moving image component images in which the object areas identified by the object area identifying section are not in positions that overlap with one another from among the plurality of moving image component images that represent a moving image of the period identified by the period identifying section.

In the output apparatus, the moving image component image selecting section may select a plurality of moving image component images in which the object areas identified by the object area identifying section are not in positions that overlap with one another from among the plurality of moving image component images included in a moving image of a first period in the moving image acquired by the moving image acquiring section, the image generating section may generate a single synthesized image by superimposing the images that include the plurality of object areas included in each moving image component image in the plurality of moving image component images selected by the moving image component image selecting section, and the output section may output the single synthesized image generated by the image generating section as the image representing the moving image of the first period instead of the plurality of moving image component images included in the moving image of the first period.

According to a second aspect related to the innovations herein, one exemplary method may include an output method. The output method includes acquiring a moving image, extracting a moving object in the moving image, identifying an object area, which is an area occupied by the object extracted in the step of extracting the moving object in each moving image component image in a plurality of moving image component images included in the moving image acquired in the step of acquiring the moving image, selecting a plurality of moving image component images in which the object areas identified in a step of identifying the object area are not in positions that overlap with one another from among the plurality of moving image component images included in the moving image acquired in the step of acquiring the moving image, generating a single synthesized image by superimposing images that include a plurality of object areas included in each moving image component image in the plurality of selected moving image component images acquired in the step of acquiring the moving image, and outputting the synthesized image generated in the step of generating the image.

According to a third aspect related to the innovations herein, one exemplary method may include a program that causes an output apparatus that outputs an image to function as a moving image acquiring section that acquires a moving image, a moving object extracting section that extracts a moving object in the moving image, an object area identifying section that identifies an object area, which is an area occupied by the object extracted by the moving object extracting section in each moving image component image in a plurality of moving image component images included in the moving image acquired by the moving image acquiring section, a moving image component image selecting section that selects a plurality of moving image component images in which the object areas identified by the object area identifying section are not in positions that overlap with one another from among the plurality of moving image component images included in the moving image acquired by the moving image acquiring section, an image generating section that generates a single synthesized image by superimposing images that include a plurality of object areas included in each moving image component image in the plurality of moving image component images selected by the moving image component image selecting section, and an output section that outputs the synthesized image generated by the image generating section.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

Through the present invention, an output apparatus is provided that can output in a form that uses the time resolution of the image capturing.

BRIEF DESCRIPTION OF THE DRAWINGS

FIG. 8 shows an example of conditions stored by the condition storing section 210 in a table format.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
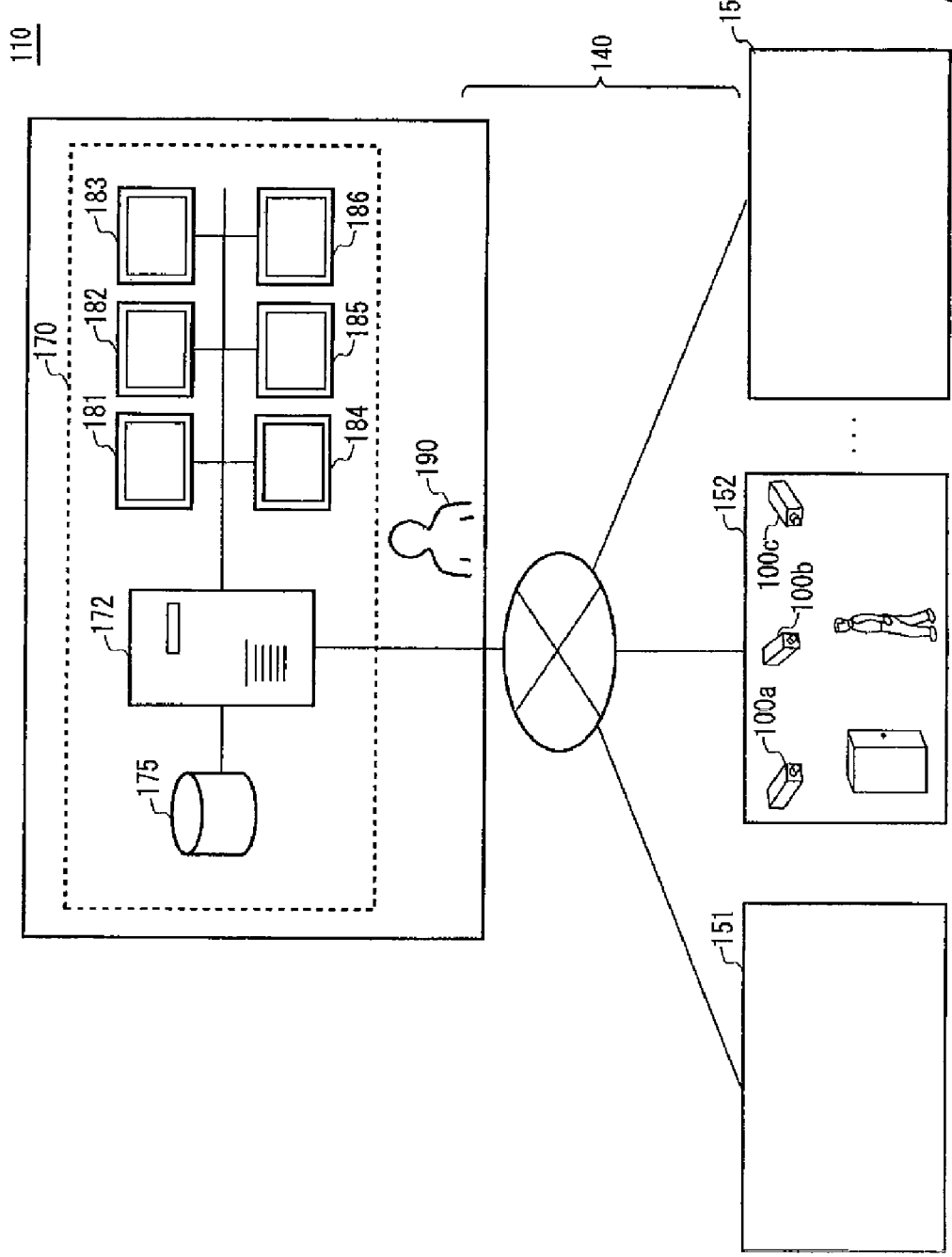
FIG. 1 shows an exemplary environment in which a monitoring system 110 is used.

FIG. 1 shows an exemplary environment in which a monitoring system 110 according to an embodiment of the present invention is used. The monitoring system 110 is provided with a plurality of pluralities of image capturing apparatuses 100a~c (referred to hereinafter collectively as image capturing apparatuses 100) disposed to capture images in a plurality of monitored areas 151~156 to capture images thereof, a transmission path 140, and an output apparatus 170. The output apparatus 170 includes an output control apparatus 172, a plurality of monitors 181~186, and a storage apparatus 175. Here, the plurality of image capturing apparatuses 100a~c is disposed in each of the monitored areas 151~156 to capture images of the plurality of monitored areas 151~156. Hereinafter, the plurality of pluralities of image capturing apparatuses 100a~c disposed in the plurality of monitored areas 151~156 is referred to collectively as the image capturing apparatuses 100.

The image capturing apparatuses 100 send captured images of the monitored areas 151~156 to the output control apparatus 172 through the transmission path 140. The output control apparatus 172 converts the images received from the image capturing apparatuses 100 into moving images having a predetermined display rate that is easily observed by an observer 190 and displays the moving images on the monitors 181~186. Here, the predetermined display rate may be lower than an image capturing rate of the image capturing apparatuses 100. Furthermore, the predetermined image display rate may be a display rate at which the monitors 181~186 can display the moving images. The storage apparatus 175 stores the moving images output by the output control apparatus 172.

The output control apparatus 172 divides the moving images received from the image capturing apparatus 100 into moving images of every period having a duration equal to a display interval of a frame image determined by the predetermined display rate. The output control apparatus 172 then extracts the movement of the person from the moving images at each divided period and identifies the moving person in the plurality of frame images that make up the moving images. The output control apparatus 172 then superimposes images in which the person is not in overlapping positions from among the images of the person identified in each frame image. The output control apparatus 172 then generates a single synthesized image by synthesizing the image obtained by superposition with a background area. The output control apparatus 172 generates a moving image obtained by creating a single string formed of each synthesized image generated for each period and displays the moving image on the monitors 181~186.

As described above, the output control apparatus 172 can convert the moving images acquired from the image capturing apparatuses 100 into moving images having a predetermined display rate and display the moving images on the monitors 181~186. At this time, because the output control apparatus 172 generates the frame pictures by superimposing the images in which the person moving from among the moving images captured by the image capturing apparatuses 100 with a capturing rate that is higher than the predetermined display rate, the observer 190 can observe fine movements of the person on the monitors 181~186. Furthermore, because the output control apparatus 172 images are synthesized in which the images of the person do not overlap with one another, the observer 190 does not lose track of the movement of the person at a time when the images generated by the output control apparatus 172 are advanced frame-by-frame. Furthermore, because the output control apparatus 172 can decrease the amount of data of the moving images that are captured by the image capturing apparatus 100 and output, the storage capacity of the storage apparatus 175 can be lowered.

The monitored areas 151~156 may be spaces in different buildings or may be different spaces in the same building. For example, the monitored areas 151~156 may be aisles between display shelves in a store. Furthermore, it goes without saying that the monitored areas 151~156 are not limited to spaces inside a building and may be open spaces not confined within a building.

Figure 2:
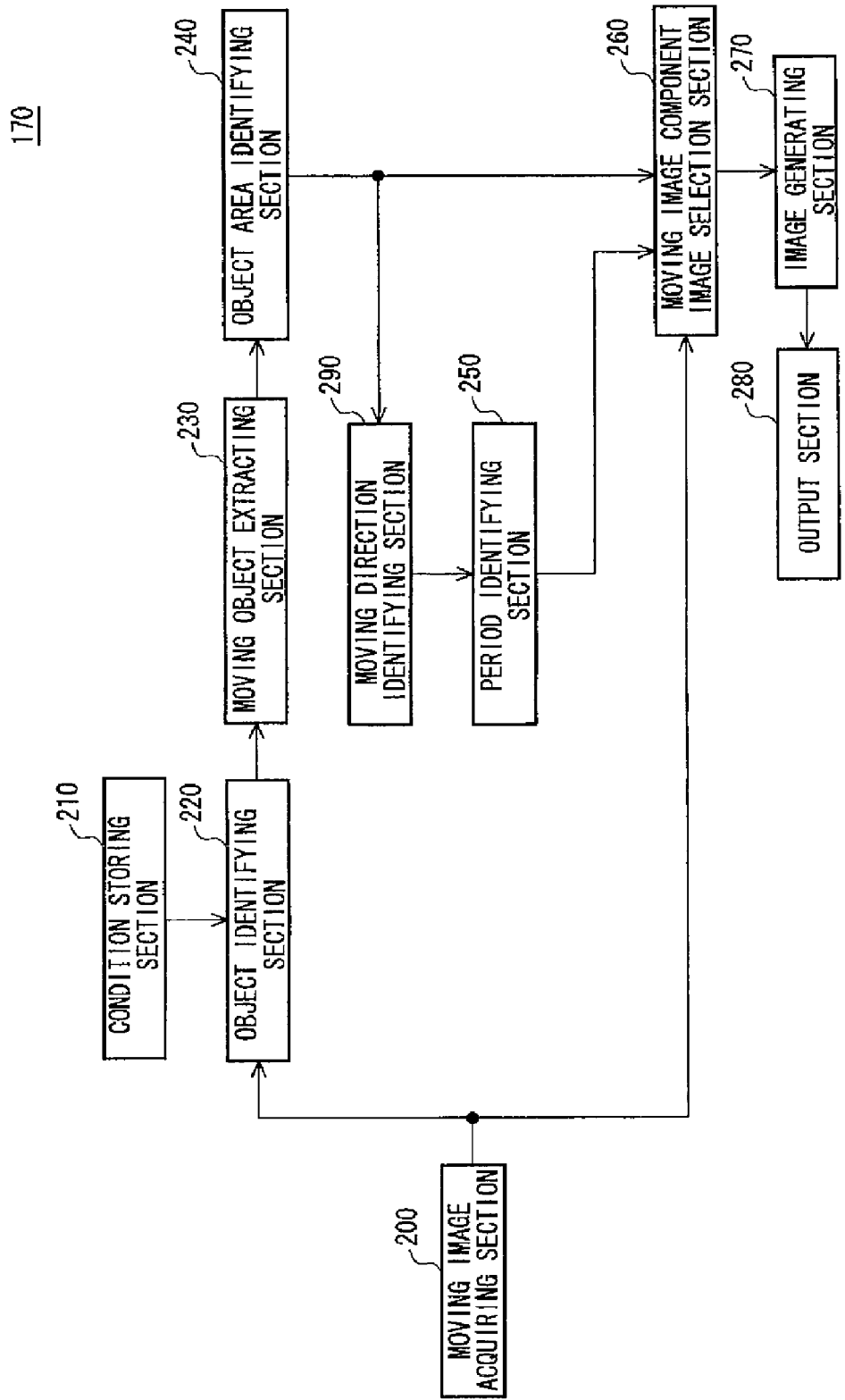
FIG. 2 shows an exemplary block structure of an output apparatus 170.

FIG. 2 shows an exemplary block structure of the output apparatus 170. The output apparatus 170 is provided with a moving image acquiring section 200, a condition storing section 210, an object identifying section 220, a moving object extracting section 230, an object area identifying section 240, a period identifying section 250, a moving image component image selecting section 260, an image generating section 270, an output section 280, and a moving direction identifying section 290.

The moving image acquiring section 200 acquires the moving images. For example, the moving image acquiring section 200 acquires the moving images captured by the image capturing apparatuses 100 from the image capturing apparatuses 100 via the transmission path 140. Then, the moving object extracting section 230 extracts an object that is moving in the moving images acquired by the moving image acquiring section 200. For example, the moving object extracting section 230 extracts the moving object from a plurality of moving image component images included in the moving images.

Specifically, the condition storing section 210 stores conditions of the objects to be extracted from the moving images. Then, the object identifying section 220 identifies objects to which the conditions stored by the condition storing section 210 are applicable. The moving object extracting section 230 then extracts the moving objects in the moving images from among the objects identified by the object identifying section 220. As another example, in a case where the moving image acquiring section 200 acquires moving images having an MPEG encoding, the moving object extracting section 230 may extract the moving objects based on moving vector information.

The object area identifying section 240 identifies an object area, which is an area occupied by the objects extracted by the moving object extracting section 230 in each moving image component image included in the moving images acquired by the moving image acquiring section 200. The moving image component image selecting section 260 then selects a plurality of moving image component images in which the object areas identified by the object area identifying section 240 do not overlap with one another from among the plurality of moving image component images included in the moving images acquired by the moving image acquiring section 200.

Then, the image generating section 270 generates a single synthesized image by superimposing the images that include the plurality of object areas included in each moving image component image selected by the moving image component image selecting section 260. The output section 280 then outputs the synthesized image generated by the image generating section 270. Here, the image generating section 270 may generate a moving image in which each of the synthesized images is a single frame. The output section 280 may then output the moving image generated by the image generating section 270. The monitors 181~186 and the storage apparatus 175 are one example of the output section 280, but the output section 280 may also display the images generated by the image generating section 270 on a display device or may record the images generated by the image generating section 270 on a recording medium.

The moving direction identifying section 290 identifies a direction in which the object extracted by the moving object extracting section 230 moves in the moving images acquired by the moving image acquiring section 200. The period identifying section 250 then identifies a period in which the amount of change in the direction identified by the moving direction identifying section 290 in the moving images acquired by the moving image acquiring section 200 is less than a predetermined amount of change. The moving image component image selecting section 260 then selects the plurality of moving image component images in which the object areas identified by the object area identifying section 240 do not overlap with one another from among the plurality of moving image component images that represent a moving image of the period identified by the period identifying section 250.

The condition storing section 210 stores conditions relating to a shape of the object to be extracted from the moving image. The object identifying section 220 then identifies objects to which the conditions relating to shape stored by the condition storing section 210 are applicable. Furthermore, the condition storing section 210 may store conditions relating to a position of the object to be extracted from the moving image. The object identifying section 220 may then identify objects to which the conditions relating to position stored by the condition storing section 210 are applicable.

Furthermore, the condition storing section 210 may store conditions relating to a movement direction of the object to be extracted from the moving image. The object identifying section 220 may then identify objects to which the conditions relating to movement direction stored by the condition storing section 210 apply. Yet further, the condition storing section 210 may store conditions relating to a movement direction of the object in real space to be extracted from the moving image. The object identifying section 220 may then identify objects to which the conditions relating to the movement direction in real space stored by the condition storing section 210 are applicable.

Figure 3:
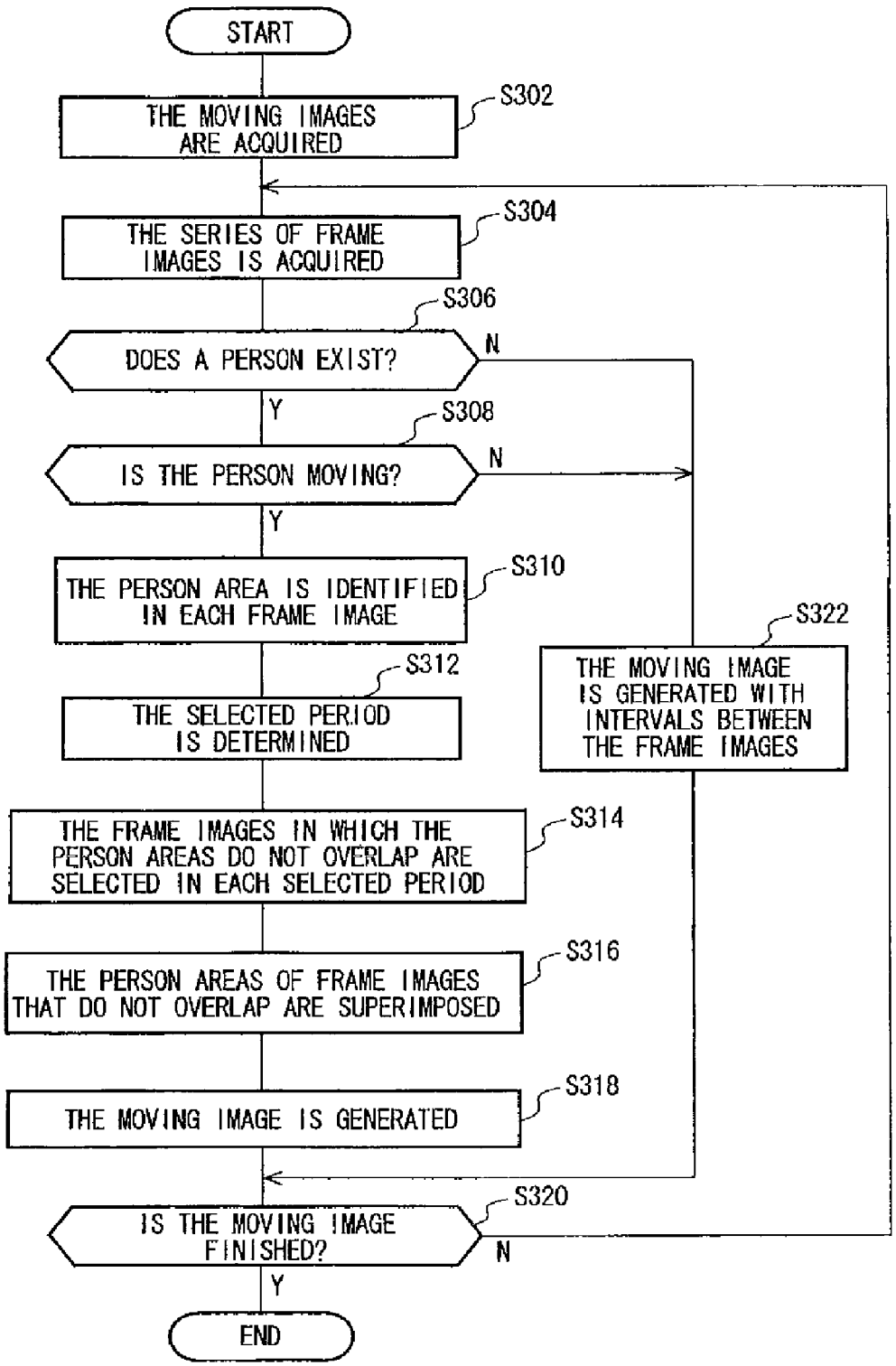
FIG. 3 shows an exemplary flow of an operation of the output apparatus 170.

FIG. 3 shows an exemplary flow of an operation of the output apparatus 170. First, the moving image acquiring section 200 acquires the moving images captured by the image capturing apparatuses 100 from the image capturing apparatuses 100 (S302). The moving image acquiring section 200 then extracts a series of frame images from the moving images acquired at S302 (S304). For example, in a case where moving images having MPEG encoding are acquired, the moving image acquiring section 200 extracts a plurality of pictures that makes up the moving image of a period that includes a prescribed number of I-pictures. As another example, the moving image acquiring section 200 may extract as the series of frame images a prescribed number of frame images that make up a moving image of a predetermined period or may extract as the series of frame images a plurality of frame images that makes up a single determined scene of the moving image based on a change in the image content of the moving image.

The object identifying section 226 makes a judgment as to whether an object indicating a person exists in the series of frame images extracted at S304 (S306). In a case where the object identifying section 220 makes a judgment at S306 that an object indicating a person exists, the moving object extracting section 230 makes a judgment as to whether the object indicating a person is moving (S308) and, if it is judged that the object indicating a person is moving, extracts the object indicating a person from the frame images. The object area identifying section 240 then identifies the area of the object indicating a person (referred to hereinafter as the person area) extracted by the moving object extracting section 230 (S310). For example, the object area identifying section 240 may extract an outline of the object indicating a person by extracting an edge or the like and set the area surrounded by the extracted outline as the person area.

The period identifying section 250 then divides the moving images acquired at S304 into a plurality of periods, such that the object moves in generally the same direction in each period (S312). The period identifying section 250 sets a plurality of the divided periods to be selected periods, which are selected moving image component images in which the person areas do not overlap. The moving image component image selecting section 260 then selects frame images in which the person areas exist in positions that do not overlap with one another from among the frame images of each selected period determined at S312 (S314).

The image generating section 270 then generates the synthesized image by superimposing the images of the person areas included in the plurality of frame images selected at S314 onto a single frame image from among the frame images selected at S314 (S316). Here, the image generating section 270 may generate the synthesized image by superimposing the frame images selected at S314. The image generating section 270 then generates the moving image using the synthesized images generated one at a time for each selected period (S318). Next, a judgment is made as to whether all processing of the moving images acquired at S302 is finished (S320). In a case where all processing is finished, the process ends, and in a case where all processing is not finished, the process returns to S304.

In a case where the object identifying section 220 makes a judgment at S306 that the an object indicating a person does not exist or a case where a judgment is made that the object indicating a person is not moving, a moving image is generated having appropriate intervals between the frame images acquired at S304 (S322) and the output apparatus 170 moves the process to S320. Here, at S322, intervals may be placed between the frame images acquired at S304 such that the generated moving image has a predetermined display rate. As described above, the output apparatus 170 can provide to the observer 190 images in which the movement of the person is easily understood by superimposing the person areas in the frame images in which the movement of the person does not over lap from the images in which the person is moving.

To avoid complication in the above description, operation of the output apparatus 170 is described above using a sequential process flow, but it goes without saying that a process that is a part within the above process can be executed in parallel with other processes. For example, the process at S302 for acquiring the moving images and the process at S304 for extracting the series of frame images can be executed in parallel with other processes.

Figure 4:
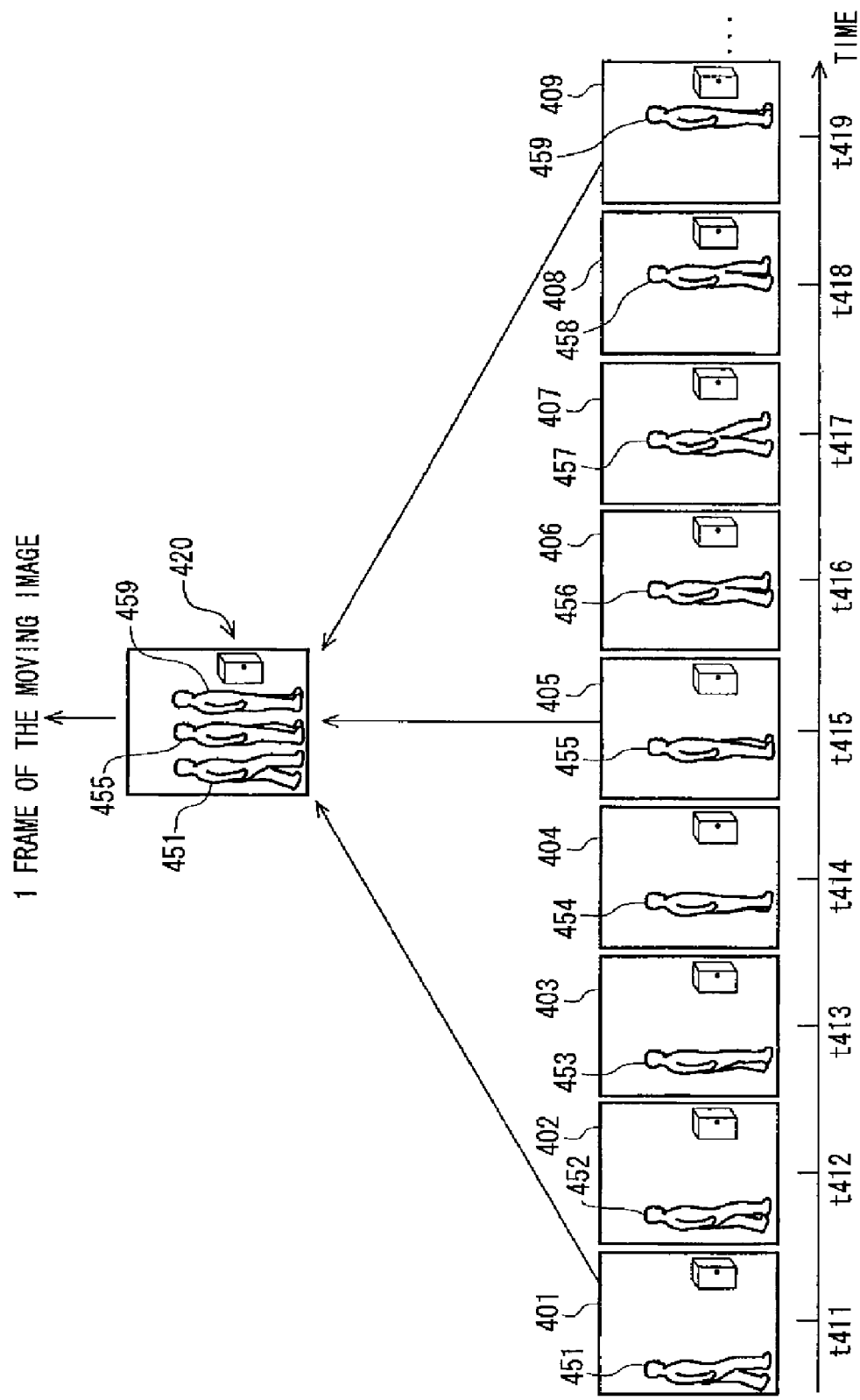
FIG. 4 shows an example of a synthesized image 420 generated by an image generating section 270.

FIG. 4 shows an example of a synthesized image 420 generated by the image generating section 270. The object area identifying section 240 identifies person areas 451~459, which are areas of a moving person, from among the frame images 401~409 captured at prescribed time intervals t411~t419 by the image capturing apparatuses 100. At this time, in a case where the frame images 401~419 are superimposed, the moving image component image selecting section 260 selects the frame images 401, 405, 409 in which the person areas 451~459 exist in positions that do not overlap with one another.

Here, the moving image component image selecting section 260 may select the frame images 401, 405, 409, in which the areas displayed by the images of the person areas 451~459 at a time when the plurality of frame images are superimposed, in a manner to be superimposed at the same positions in real space. Therefore, even in a case where the images of the monitored areas 151~156 are captured while the image capturing apparatuses 100 change the direction of the image capturing, frame images can be selected in which the person areas 451~459 are in positions that do not overlap.

Then, the image generating section 270 generates the synthesized image 420 by superimposing the person areas 451, 459 included in the frame images 401, 409 onto the frame image 405. Here, the image generating section 270 generates the synthesized image 420 as a single frame image in a moving image of a period of time t401~t409. Furthermore, the image generating section 270 may generate the synthesized image by superimposing frame images 401, 405, 409.

In the manner described above, the moving image component image selecting section 260 can select a plurality of moving image component images in which the object areas identified by the object area identifying section 240 are in positions that do not overlap with one another from among the plurality of moving image component images included in a moving image of a first period in the moving images acquired by the moving image acquiring section 200. The image generating section 270 then generates a single synthesized image by superimposing the images that include the plurality of object areas included in each moving image component image selected by the moving image component image selecting section 260. The output section 280 then outputs as the image indicating a moving image of the first period the single synthesized image generated by the image generating section 270 instead of the plurality of moving image component images included in the moving image of the first period.

Figure 5:
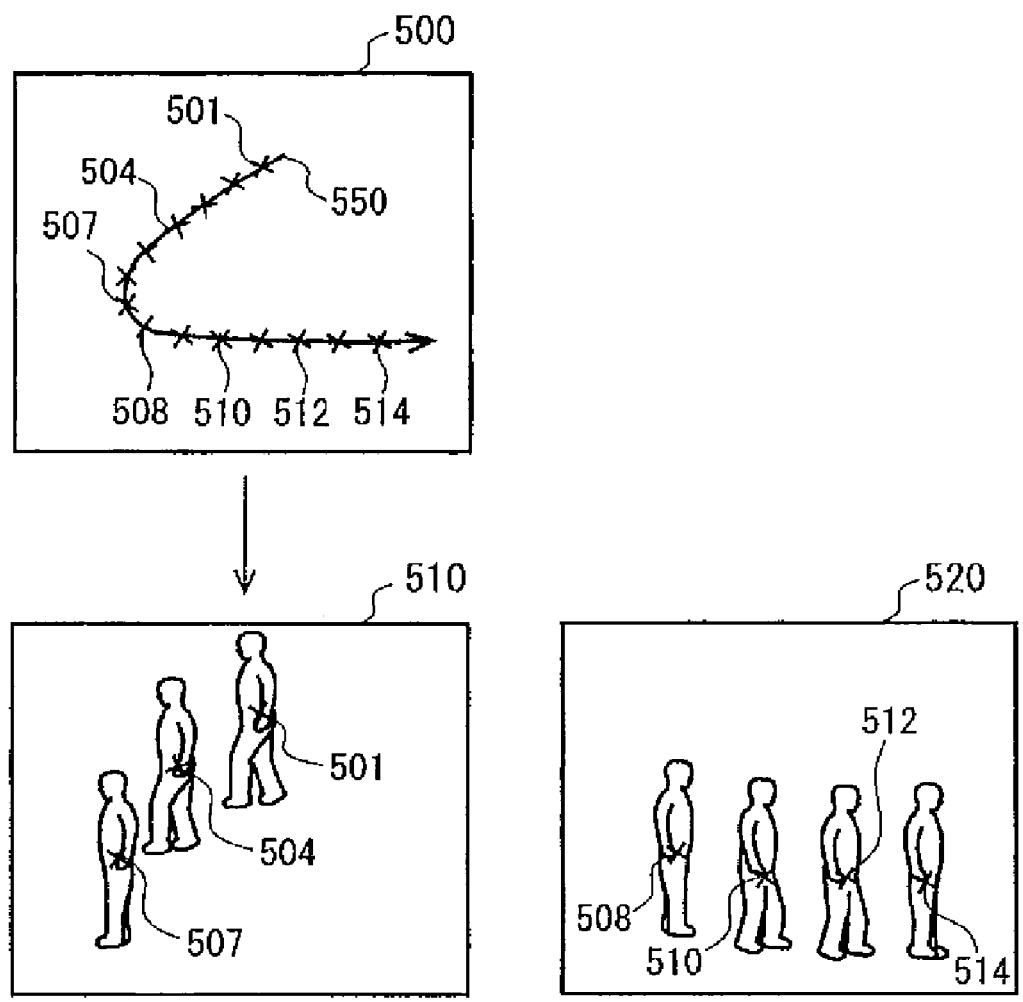
FIG. 5 shows an example of synthesized images generated by the image generating section 270.

FIG. 5 shows an example of synthesized images generated by the image generating section 270. In FIG. 5, the moving direction identifying section 290 calculates the trajectory 550 of the object area by interpolating the positions 501~514 of a weighted center of the object area identified by the object area identifying section 240. The moving direction identifying section 290 then calculates the direction of the object in the positions 501~514 by differentiating the trajectory 550. Then, the period identifying section 250 identifies a period in which an angle made by the direction of the object is less than or equal to a predetermined angle. In FIG. 5, the period identifying section 250 identifies a period in which the weighted center of the object area is in the positions 501~507 and a period in which the weighted center of the object area is in the positions 508~514.

The moving image component image selecting section 260 then selects the frame images in which the weighted center of the object area is in the positions 501, 504, 507 from among the frame images included in the moving image of the period in which the weighted center of the object area is in the positions 501~507. Then, the image generating section 270 generates the synthesized image 510 from the frame images selected by the moving image component image selecting section 260. Furthermore, the moving image component image selecting section 260 selects the frame images in which the weighted center of the object area is in the positions 508, 510, 512, 514 from among the frame images included in the moving image of the period in which the weighted center of the object area is in the positions 508~514 and the image generating section 270 then generates the synthesized image 520 from the frame images selected by the moving image component image selecting section 260. Through such a process, the image generating section 270 can generate a single synthesized image from the moving image of a period in which the direction in which the object moves is substantially uniform.

Figure 6:
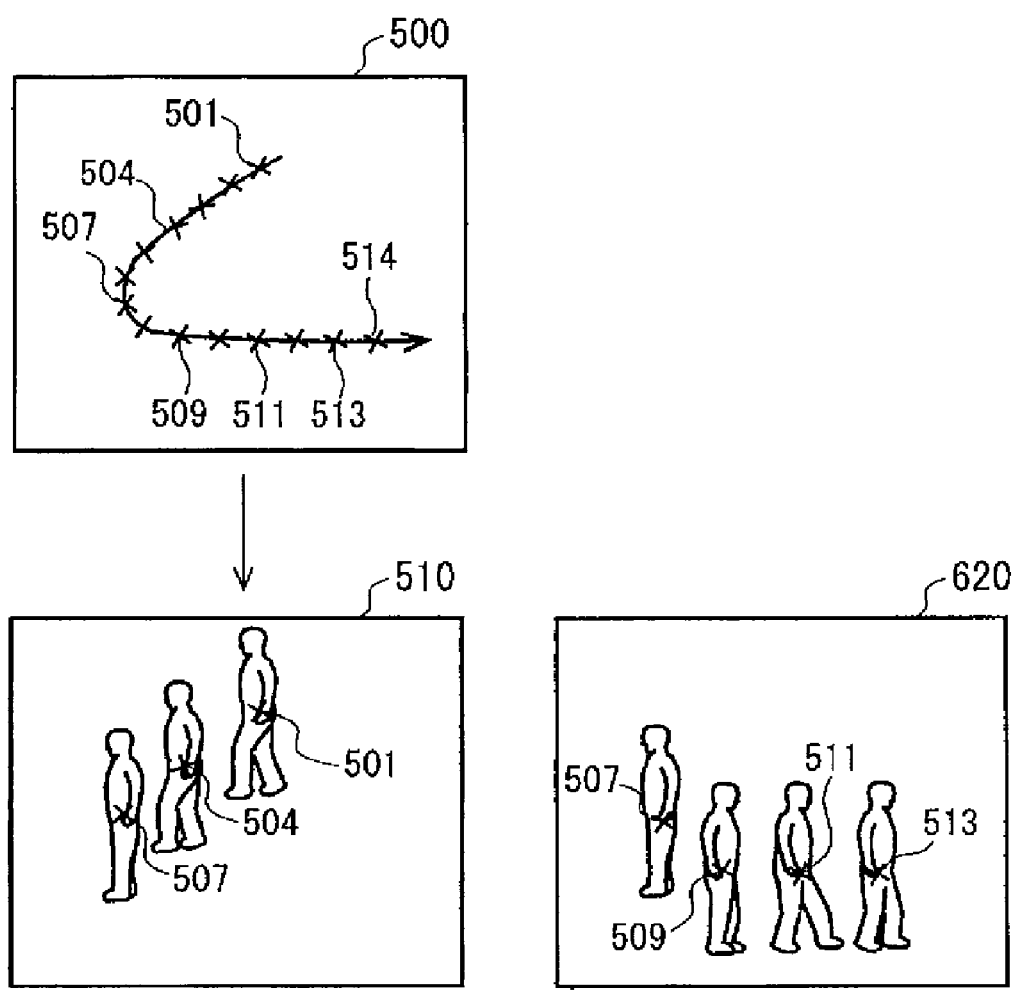
FIG. 6 shows another example of synthesized images generated by the image generating section 270.

FIG. 6 is another example of synthesized images generated by the image generating section 270. In the same manner as FIG. 5, the moving image component image selecting section 260 selects the frame images in which the weighted center of the object area is in the positions 501, 504, 507 from among the frame images included in the moving image of the period in which the weighted center of the object area is in the positions 501~507 and the image generating section 270 generates the synthesized image 510 from the frame images selected by the moving image component image selecting section 260. FIG. 6 differs from FIG. 5 in that the period identifying section 250 sets the selected period, in which the frame images are selected to generate the synthesized image 620 to be displayed at a timing immediately subsequent to the synthesized image 510, to be a consecutive period that includes a period that is at least a portion of the selected period and a period that continues from the aforementioned period.

Specifically, the period identifying section 250 selects the period in which the weighted center of the object area is in the positions 507~514. The moving image component image selecting section 260 then selects the frame images in which the weighted center of the object area is in the positions 507, 509, 511, 513 from among the frame images included in the moving image of the period in which the weighted center of the object area is in the positions 507~514 and the image generating section 270 generates the synthesized image 620 from the frame images selected by the moving image component image selecting section 260.

In such a manner, the moving image component image selecting section 260 selects both a first group of moving image component images in which positions the object areas identified by the object area identifying section 240 do not overlap with one another from among the plurality of moving image component images included in the moving image of the first period in the moving images acquired from the moving image acquiring section 200 and a second group of moving image component images in which positions the object areas identified by the object area identifying section 240 do not overlap with one another from among at least a portion of the moving image component images in the plurality of moving image component images included in the moving image of the first period and the plurality of moving image component images included in the moving image of the second period continuing from the first period. The image generating section 270 then generates a first synthesized image by superimposing the images that include the plurality of object areas included in each moving image component image of the first group and a second synthesized image by superimposing the images that include the plurality of object areas included in each moving image component image of the second group. The output section 280 then outputs the first synthesized image and the second synthesized image generated by the image generating section 270 as the images representing the moving images of the first period and the second period, respectively, instead of the plurality of moving image component images included in the moving images of the first period and the second period.

Through such control, the output apparatus 170 can include a portion of movement of a person in a certain frame in the immediately subsequent frame. Therefore, even in a case where the observer 190 plays the moving image output by the output apparatus 170 one frame at a time, the observer 190 can easily comprehend the flow of movement of a person without comparing a certain frame to an immediately subsequent frame.

Figure 7:
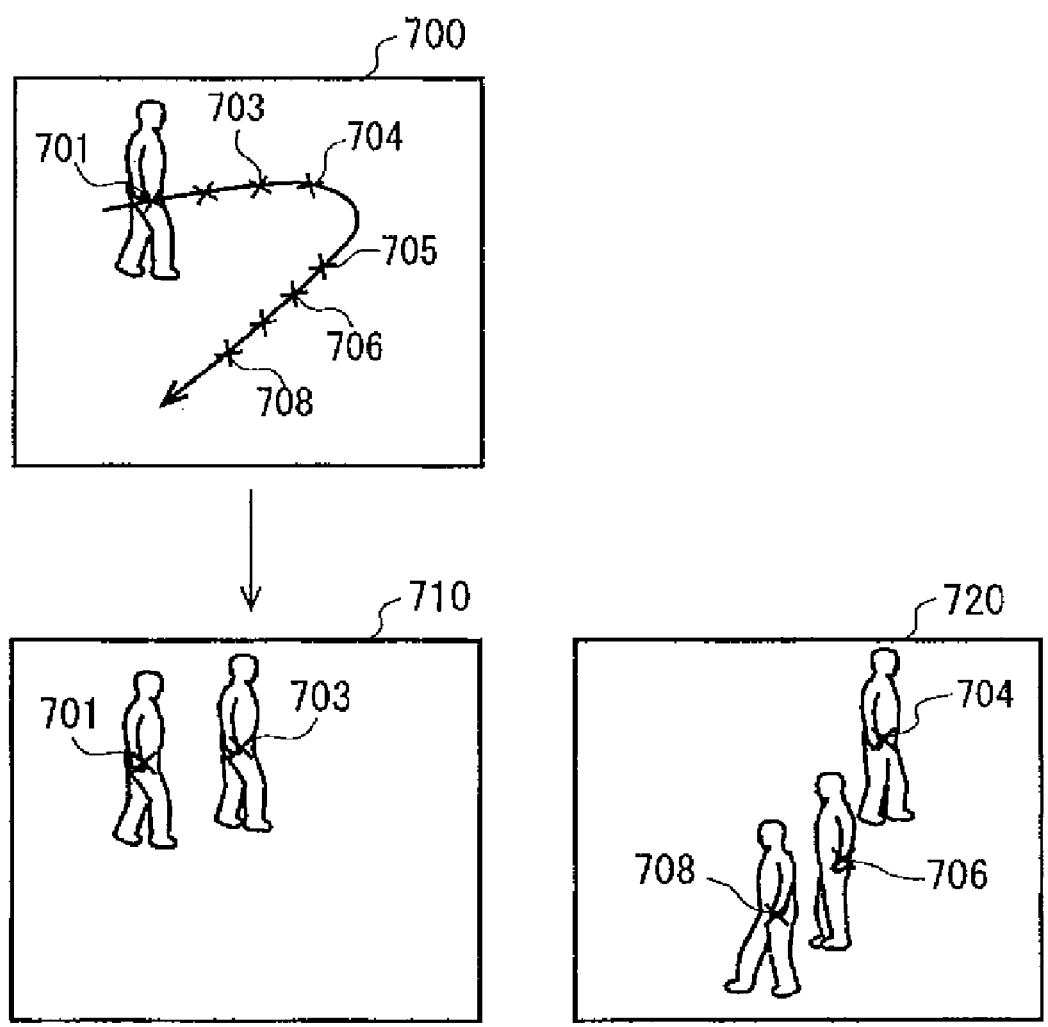
FIG. 7 shows yet another example of synthesized images generated by the image generating section 270.

FIG. 7 shows yet another example of synthesized images generated by the image generating section 270. In FIG. 7, positions 701~708 indicate positions of the weighted center of the object area identified by the object area identifying section 240. In the example shown in FIG. 7, the period identifying section 250 identifies as the selected periods in which the frame images are selected to generate the synthesized images a period in which the weighted center of the object area is at positions 701~703 and a period in which the weighted center of the object area is at positions 704~708.

For example, in a case where the period in which the weighted center of the object area is at position 701~708 is identified as the selected period, the positions at which the object areas do not overlap are sequentially positions 701, 703, 708. However, an interval of five image capturing intervals exists between the frame image in which the weighted center of the object area is at the position 703 and the frame image in which the weighted center of the object area is at the position 708, so that the observer 190 finds it difficult to comprehend the movement of the person. In view of this, the period identifying section 250 partitions a selected period to be an interval until a time of capturing of the frame image in which the weighted center of the object area is at the position 703. The period identifying section 250 then identifies as the selected period a period from a time at which the frame image in which the weighted center of the object area is at the position 704 is captured until a time at which the frame image in which the weighted center of the object area is at the position 708 is captured. In such a manner, the period identifying section 250 sets a selected period in which time intervals between captures of the frame images that include the object areas that do not overlap with one another are shorter than prescribed durations, for example, durations of five image capturing intervals of the image capturing apparatuses 100.

The moving image component image selecting section 260 then selects the frame images in which the weighted center of the object area is in the positions 701, 703 from among the frame images included in the moving image of the period in which the weighted center of the object area is in the positions 701~703. The image generating section 270 then generates the synthesized image 710 from the frame images selected by the moving image component image selecting section 260. Furthermore, The moving image component image selecting section 260 selects the frame images in which the weighted center of the object area is in the positions 704, 706, 708 from among the frame images included in the moving image of the period in which the weighted center of the object area is in the positions 704~708 and the image generating section 270 generates the synthesized image 720 from the frame images selected by the moving image component image selecting section 260.

In such a manner, the period identifying section 250 identifies a period in which time intervals between the moving image component images that include the object areas that do not overlap with one another in the moving images acquired by the moving image acquiring section 200 are shorter than prescribed durations. The moving image component image selecting section 260 then selects a plurality of moving image component images in which the object areas identified by the object area identifying section 240 are in positions that do not overlap with one another from among the plurality of moving image component images representing the moving image of the period identified by the period identifying section 250. Through such control, the image generating section 270 can prevent the range of motion of the object in the output moving image from becoming too large, thereby preventing the observer 190 from feeling that the movement of the object is not continuous.

FIG. 8 shows an example of conditions stored by the condition storing section 210 in a table format. The condition storing section 210 stores a plurality of conditions relating to a shape, a color, a position in the image, a direction, and a type applicable to the object to be extracted. For example, the condition storing section 210 stores n conditions (shape 1 to shape n), each of which designates an outline shape of the object to be extracted. For example, the condition storing section 210 may store vector information that designates a vector position of the object to be extracted. Specifically, the condition storing section 210 may store conditions that designate a shape of a head of a person. More specifically, the condition storing section 210 may store conditions that designate a shape of the head of a person or a positional relationship of a face, eyes, a mouth, a nose, and eyebrows included in the head. In such a manner, the condition storing section 210 may store conditions applicable to an object that can be identified as a photographed subject, which is the object to be extracted from the moving image.

Furthermore, the condition storing section 210 stores n conditions (color range 1 to color range n), each of which designates a color included in the object to be extracted. For example, the condition storing section 210 may store a color range that indicates a color that must be included in the object to be extracted in an amount such that the percentage of surface area that includes the color is greater than or equal to a prescribed percentage of the surface area. The object identifying section 220 identifies an object in which a percentage of the surface area that includes the color included in the color range designated by the condition storing section 210 is greater than or equal to the prescribed percentage as an object to which the conditions determined by the condition storing section 210 are applicable.

Furthermore, the condition storing section 210 stores n conditions (position range 1 to position range n), each of which designates a position in which the object to be extracted exists. For example, the condition storing section 210 may store a position range in the image in which the object to be extracted must exist. The object identifying section 220 identifies an object that is positioned in the image within the position range determined by the condition storing section 210 as an object to which the conditions determined by the condition storing section 210 are applicable.

Furthermore, the condition storing section 210 stores n conditions (angle range 1 to angle range n), each of which designates a range of a plurality of directions in which the object to be extracted moves. For example, the condition storing section 210 may store an angle range represented by an angle $\theta$ on a coordinate axis in the image and an angle difference $\Delta\theta$ centered on the angle $\theta$. In such a case, the object identifying section 220 may make a judgment that an object to which the conditions determined by the condition storing section 210 are applicable exists in a case where an object is detected that has a direction of motion within an angle range from an angle $(\theta-\Delta\theta)$ to an angle $(\theta+\Delta\theta)$ in the image.

Here, the condition storing section 210 may store a combination of the aforementioned position range and angle range as a condition indicating a direction of motion of the object to be extracted. For example, the condition storing section 210 may store as the conditions for extracting a person from moving images captured inside a room an angle range that includes angles that indicate a direction toward an area that is an important observational target from the entrance of the room. In such a case, the observer 190 can adequately observe a person intruding into the room.

Furthermore, the condition storing section 210 stores n conditions (type 1 to type n), each of which designates a type of the object to be extracted. For example, the condition storing section 210 may store a combination of the aforementioned shape and color ranges as a condition that determines the type of the object.

In the above description, an embodiment is described in which the output apparatus 170 acquires moving images captured by the image capturing apparatuses 100 and outputs the images, but in other embodiments the output apparatus 170 may include the image capturing function of the image capturing apparatuses 100. For example, the moving image acquiring section 200 may be an image capturing section that captures a moving image of the monitored areas. Furthermore, the frame image in the present embodiment is an example of a moving image component image, and the moving image component image includes field images as well.

Figure 9:
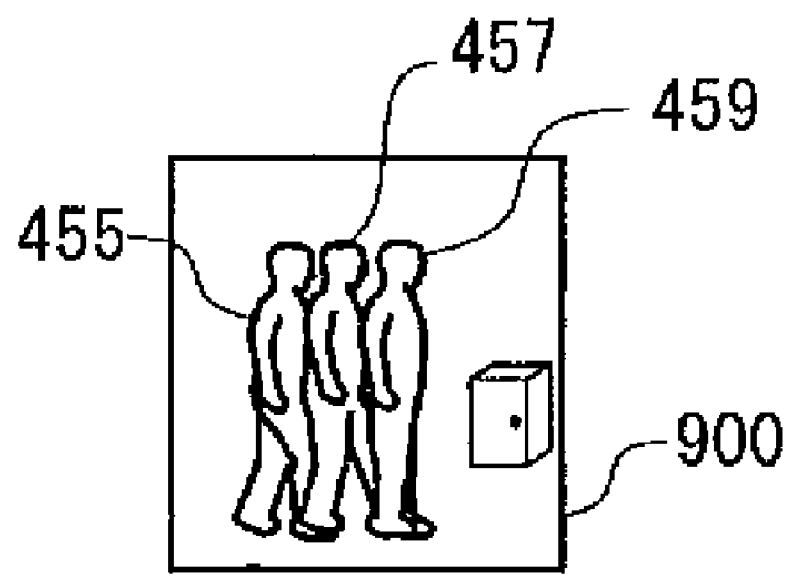
FIG. 9 shows another example of a synthesized image

FIG. 9 shows another example of a synthesized image. In the example shown in FIG. 4, the moving image composite image selecting section 260 selects the frame images in which the positions of the person areas identified by the object identifying section 220 do not overlap. As another selection method, the moving image component image selecting section 260 may select frame images in which the positions of at least a portion of the person, for example, the areas that can identify a person, do not overlap.

For example, the object identifying section 220 may identify a characteristic portion of a person. For example, the object identifying section 220 may identify objects that can identify a person such as the head of a person or the face, the eyes, the mouth, or the nose of the person to which the conditions stored by the condition storing section 210 are applicable. The moving image component image selecting section 260 then selects the frame images in which the positions of the object areas of the moving object extracted from among the identified objects do not overlap with one another.

For example, the object identifying section 220 may identify a head areas included in the person areas 451~459 shown in FIG. 4 as the objects to which the conditions stored by the condition storing section 210 are applicable from among the frame images 401~409. The moving image component image selecting section 260 then selects the frame images 405, 407, 409 in which the positions of the head areas do not overlap with one another. The image generating section 270 then generates a synthesized image 900 by superimposing onto the frame image 405 the person area 457 that includes the head of the person and is included in the frame image 407 and the person area 459 that includes the head of the person and is included in the frame image 409. Here, the image generating section 270 may also generate the synthesized image 900 by adding the person areas 457, 459 into the frame image 405.

The image generating section 270 may also superimpose the images that include the object areas in order of a times at which the frame images are captured or in a reverse order of the times at which the frame images are captured. For example, the image generating section 270 may generate the synthesized image 900 by superimposing onto the frame image 405 the person area 457 and the person area 459, sequentially. In such a manner, because frame images in which the positions of the characteristic areas such as the head of the person do not overlap are selected and synthesized, the person can be identified even from synthesized images in which the body of the person overlaps.

Figure 10:
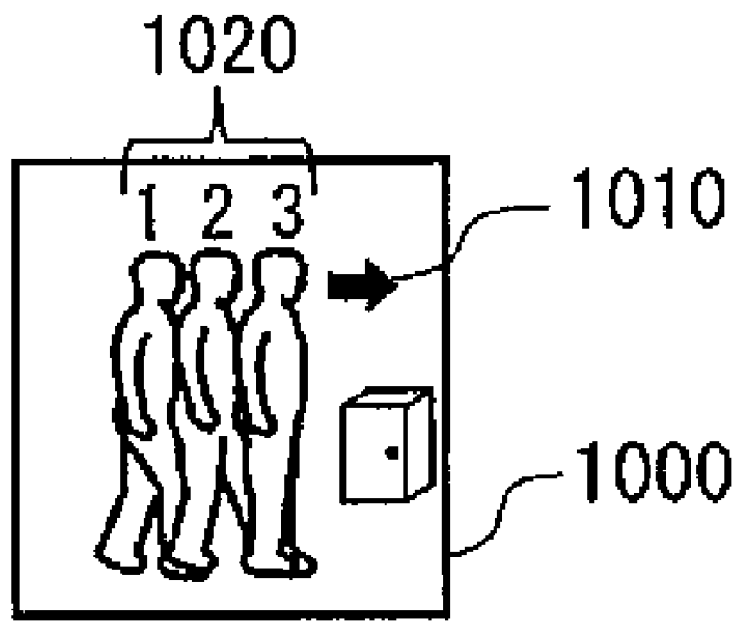
FIG. 10 shows yet another example of a synthesized image.

FIG. 10 shows yet another example of a synthesized image. The image generating section 270 generates information indicating movement of the object in addition to the synthesized image. The information indicating the movement of the object may be information that indicates a direction of movement of the object. For example, the image generating section 270 may generate along with the synthesized image 900 a mark 1010 that includes an arrow indicating the direction of movement identified by the moving direction identifying section 290.

As another example, the information indicating the movement of the object may be information that indicates a timing at which the frame images selected by the moving image component image selecting section 260 are captured. For example, the image generating section 270 may generate along with the synthesized image 900 a mark 1020 that indicates an order in which the frame images selected by the moving image component image selecting section 260 are captured. Here, the timing at which the frame images are captured may be the actual time at which the frame images are captured. The image generating section 270 then generates a synthesized image 1000 obtained by synthesizing the synthesized image 900 with at least one of the marks 1010, 1020 and supplies the synthesized image 1000 to the output section 280. Here, the image generating section 270 may synthesize the mark 1020 in a proximity of the person areas 455, 457, 459 in a manner such that an association can be seen between the information indicating timing included in the mark 1020 and the aforementioned person areas.

The output section 280 then outputs the synthesized image 1000 supplied from the image generating section 270. Here, in a case where the synthesized image is displayed as a static image, the image generating section 270 may generate the synthesized image 1000 that includes information indicating the direction of movement of the object. For example, the image generating section 270 may generate the synthesized image 1000 in a case where play-back of the moving image is stopped. In such a manner, because the image generating section 270 generates a mark 1010 and a mark 1020, the observer 190 can easily identify the movement of a person, even from the synthesized image 1000 in which the body of the person overlaps.

Figure 11:
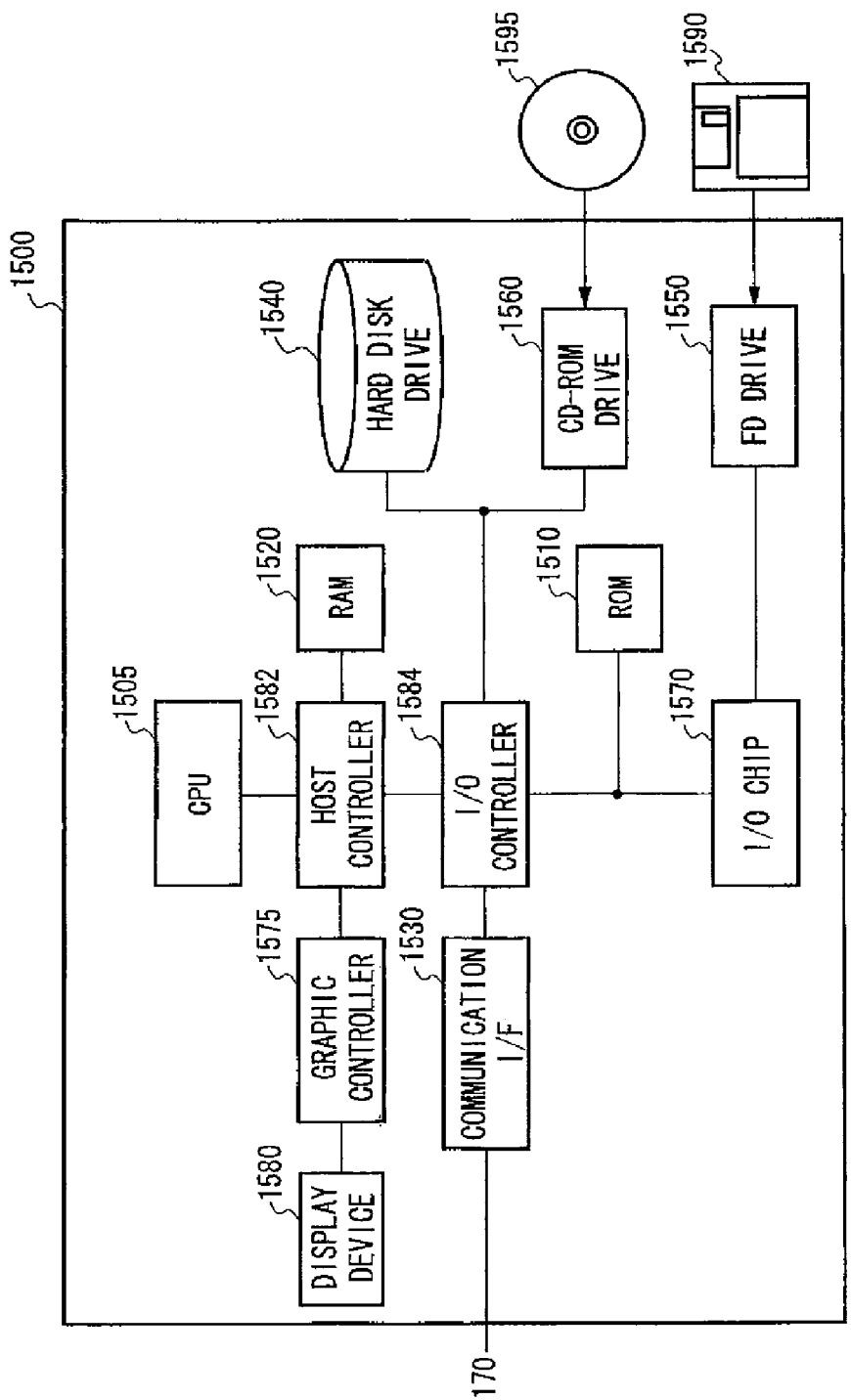
FIG. 11 shows an exemplary hardware configuration of a computer 1500 according to the output apparatus 170.

FIG. 11 shows an exemplary hardware configuration of a computer 1500 according to the output apparatus 170. The computer 1500 is provided with a CPU peripheral section that includes a CPU 1505, a RAM 1520, a graphic controller 1575, and a display apparatus 1580 connected to one another by a host controller 1582; an input/output section that includes a communication interface 1530, a hard disk drive 1540, and a CD-ROM drive 1560, all of which are connected to the host controller 1582 by an input/output controller 1584; and a legacy input/output section that includes a ROM 1510, a flexible disk drive 1550, and an input/output chip 1570, all of which are connected to the input/output controller 1584.

The host controller 1582 is connected to the RAM 1520 and is also connected to the CPU 1505 and graphic controller 1575 accessing the RAM 1520 at a high transfer rate. The CPU 1505 operates to control each section based on programs stored in the ROM 1510 and the RAM 1520. The graphic controller 1575 acquires image data generated by the CPU 1505 or the like on a frame buffer disposed inside the RAM 1520 and displays the image data in the display apparatus 1580. In addition, the graphic controller 1575 may internally include the frame buffer storing the image data generated by the CPU 1505 or the like.

The input/output controller 1584 connects the hard disk drive 1540, the communication interface 1530 serving as a relatively high speed input/output apparatus, and the CD-ROM drive 1560 to the host controller 1582. The hard disk drive 1540 stores the programs and data used by the CPU 1505 in the computer 1500. The communication interface 1530 communicates with the output apparatus 170 via a network and provides the output apparatus 170 with the programs and the data. The CD-ROM drive 1560 reads the programs and data from a CD-ROM 1595 and provides the read information to the hard disk drive 1540 and the communication interface 1530 via the RAM 1520.

Furthermore, the input/output controller 1584 is connected to the ROM 1510, and is also connected to the flexible disk drive 1550 and the input/output chip 1570 serving as a relatively high speed input/output apparatus. The ROM 1510 stores a boot program performed when the computer 1500 starts up, a program relying on the hardware of the computer 1500, and the like. The flexible disk drive 1550 reads programs or data from a flexible disk 1590 and supplies the read information to the hard disk drive 1540 and the communication interface 1530 via the RAM 1520. The input/output chip 1570 connects the flexible disk drive 1550 to each of the input/output apparatuses via, for example, a parallel port, a serial port, a keyboard port, a mouse port, or the like.

The programs supplied to the communication interface 1530 via the RAM 1520 are stored on a recording medium such as the flexible disk 1590, the CD-ROM 1595, or an IC card and are provided by the user. The programs are read from the recording medium, provided to the communication interface 1530 via the RAM 1520, and sent to the output apparatus 170 via the network. The programs sent to the output apparatus 170 are installed in the output apparatus 170 and performed.

The programs installed in the output apparatus 170 and performed cause the output apparatus 170 to function as the moving image acquiring section 200, the condition storing section 210, the object identifying section 220, the moving object extracting section 230, the object area identifying section 240, the period identifying section 250, the moving image component image selecting section 260, the image generating section 270, the output section 280, and the moving direction identifying section 290 described in FIGS. 1 to 8.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to the Internet or a specialized communication network may be used as the storage medium and the programs may be provided to the computer 1500 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. An output apparatus, comprising one or more processors configured to function as a plurality of sections comprising:
   a moving image acquiring section that receives via a transmission path a moving image obtained by capturing a monitored area;
   a moving object extracting section that extracts a moving object in the moving image received by the moving image acquiring section;
   an object area identifying section that identifies an object area, which is an area occupied by the object extracted by the moving object extracting section in each moving image component image in a plurality of moving image component images included in the moving image received by the moving image acquiring section;

a moving image component image selecting section that selects a plurality of moving image component images in which the object areas identified by the object area identifying section are not in positions that overlap with one another from among the plurality of moving image component images included in the moving image received by the moving image acquiring section;

an image generating section that generates a single synthesized image by superimposing images that include a plurality of object areas included in each moving image component image in the plurality of moving image component images selected by the moving image component image selecting section; and an output section that outputs the synthesized image generated by the image generating section, wherein the moving image component image selecting section selects a plurality of moving image component images in which the object areas identified by the object area identifying section are not in positions that overlap with one another from among the plurality of moving image component images included in a moving image of a first period in the moving image received by the moving image acquiring section, the image generating section generates a single synthesized image by superimposing the images that include the plurality of object areas included in each moving image component image in the plurality of moving image component images selected by the moving image component image selecting section, the output section outputs the single synthesized image generated by the image generating section as the image representing the moving image of the first period instead of the plurality of moving image component images included in the moving image of the first period, the moving image component image selecting section selects a first group of moving image component images in which the object areas identified by the object area identifying section are not in positions that overlap with one another from among the plurality of moving image component images included in the moving image of the first period in the moving image received by the moving image acquiring section and selects a second group of moving image component images in which the object areas identified by the object area identifying section are not in positions that overlap with one another from among at least a portion of the moving image component images in the plurality of moving image component images included in the moving image of the first period and from among the plurality of moving image component images included in the moving image of a second period that follows the first period, the image generating section generates a first synthesized image by superimposing the images that include the plurality of object areas included in each moving image component image of the first group and generates a second synthesized image by superimposing the images that include the plurality of object areas included in each moving image component image of the second group, and the output section outputs the first synthesized image and the second synthesized image generated by the image generating section as the images representing the moving images of the first period and the second period, respectively, instead of the plurality of moving image component images included in the moving images of the first period and the second period.

2. The output apparatus comprising one or more processors configured as a plurality of sections according to claim 1, the sections further comprising:

a moving direction identifying section that identifies a direction in which the object extracted by the moving object extracting section moves in the moving image received by the moving image acquiring section; and a period identifying section that identifies a period in which an amount of change in a direction identified by the moving direction identifying section is less than a predetermined amount of change in the moving image received by the moving image acquiring section, wherein the moving image component image selecting section selects a plurality of moving image component images in which the object areas identified by the object area identifying section are not in positions that overlap with one another from among the plurality of moving image component images that represent a moving image of the period identified by the period identifying section.

3. The output apparatus comprising one or more processors configured as a plurality of sections according to claim 1, the sections further comprising a period identifying section that identifies a period in which time intervals between moving image component images that include the object areas that do not overlap with each other are shorter than predetermined durations in the moving image received by the moving image acquiring section, wherein the moving image component image selecting section selects a plurality of moving image component images in which the object areas identified by the object area identifying section are not in positions that overlap with one another from among the plurality of moving image component images that represent a moving image of the period identified by the period identifying section.

4. The output apparatus comprising one or more processors configured as a plurality of sections according to claim 1, the sections further comprising:

a condition storing section that stores a condition concerning objects to be extracted from the moving image; and an object identifying section that identifies objects to which the condition stored by the condition storing section is applicable, wherein the moving object extracting section extracts the moving object in the moving image from among the objects identified by the object identifying section.

5. The output apparatus according to claim 4, wherein
the condition storing section stores a condition relating to a shape of the object to be extracted from the moving image, and
the object identifying section identifies objects to which the condition relating to the shape stored by the condition storing section is applicable.

6. The output apparatus according to claim 4, wherein
the condition storing section stores a condition relating to a position of the object to be extracted from the moving image, and
the object identifying section identifies objects to which the condition relating to the position stored by the condition storing section is applicable.

7. The output apparatus according to claim 4, wherein
the condition storing section stores a condition relating to a direction of motion of the object to be extracted from the moving image, and
the object identifying section identifies objects to which the condition relating to the direction stored by the condition storing section is applicable.

8. The output apparatus according to claim 7, wherein
the condition storing section stores a condition relating to a direction of motion in real space of the object to be extracted from the moving image, and
the object identifying section identifies objects to which the condition relating to the direction in real space stored by the condition storing section is applicable.

9. An output method, comprising:
acquiring a moving image;
extracting a moving object in the moving image;
identifying an object area, which is an area occupied by the object extracted in the step of extracting the moving object in each moving image component image in a plurality of moving image component images included in the moving image acquired in the step of acquiring the moving image;
selecting a plurality of moving image component images in which the object areas identified in the step of identifying the object area are not in positions that overlap with one another from among the plurality of moving image component images included in the moving image acquired in the step of acquiring the moving image;
generating a single synthesized image by superimposing images that include a plurality of object areas included in each moving image component image in the plurality of selected moving image component images acquired in the step of acquiring the moving image; and
outputting the synthesized image generated in the step of generating the image, wherein
the selecting step selects a plurality of moving image component images in which the object areas identified are not in positions that overlap with one another from among the plurality of moving image component images included in a moving image of a first period in the moving image acquired,
the generating step generates a single synthesized image by superimposing the images that include the plurality of object areas included in each moving image component image in the plurality of moving image component images selected,
the outputting step outputs the single synthesized image generated as the image representing the moving image of the first period instead of the plurality of moving image component images included in the moving image of the first period,
the selecting step selects a first group of moving image component images in which the object areas identified are not in positions that overlap with one another from among the plurality of moving image component images included in the moving image of the first period in the moving image acquired and selects a second group of moving image component images in which the object areas identified are not in positions that overlap with one another from among at least a portion of the moving image component images in the plurality of moving image component images included in the moving image of the first period and from among the plurality of moving image component images included in the moving image of a second period that follows the first period,
the generating step generates a first synthesized image by superimposing the images that include the plurality of object areas included in each moving image component image of the first group and generates a second synthesized image by superimposing the images that include the plurality of object areas included in each moving image component image of the second group, and
the outputting step outputs the first synthesized image and the second synthesized image generated as the images representing the moving images of the first period and the second period, respectively, instead of the plurality of moving image component images included in the moving images of the first period and the second period.

10. The output method according to claim 9, further comprising:
identifying a direction in which the object extracted moves in the moving image acquired; and
identifying a period in which an amount of change in a direction identified is less than a predetermined amount of change in the moving image acquired, wherein the selecting step selects a plurality of moving image component images in which the object areas identified are not in positions that overlap with one another from among the plurality of moving image component images that represent a moving image of the period identified.

11. The output method according to claim 9, further comprising:
identifying a period in which time intervals between moving image component images that include the object areas that do not overlap with each other are shorter than predetermined durations in the moving image acquired, wherein the selecting step selects a plurality of moving image component images in which the object areas identified are not in positions that overlap with one another from among the plurality of moving image component images that represent a moving image of the period identified.

12. The output method according to claim 9, further comprising:
storing a condition concerning objects to be extracted from the moving image; and
identifying objects to which the condition stored is applicable, wherein the extracting step extracts the moving object in the moving image from among the objects identified.

13. The output method according to claim 12, wherein
the storing step stores a condition relating to a shape of the object to be extracted from the moving image, and
the object identifying step identifies objects to which the condition relating to the shape stored is applicable.

14. The output method according to claim 12, wherein
the storing step stores a condition relating to a position of the object to be extracted from the moving image, and
the object identifying step identifies objects to which the condition relating to the position stored is applicable.

15. A non-transitory computer readable medium that causes an output apparatus that outputs an image to function as:
a moving image acquiring section that acquires a moving image;
a moving object extracting section that extracts a moving object in the moving image;
an object area identifying section that identifies an object area, which is an area occupied by the object extracted by the moving object extracting section in each moving image component image in a plurality of moving image component images included in the moving image acquired by the moving image acquiring section;
a moving image component image selecting section that selects a plurality of moving image component images in which the object areas identified by the object area identifying section are not in positions that overlap with one another from among the plurality of moving image component images included in the moving image acquired by the moving image acquiring section;

an image generating section that generates a single synthesized image by superimposing images that include a plurality of object areas included in each moving image component image in the plurality of moving image component images selected by the moving image component image selecting section; and an output section that outputs the synthesized image generated by the image generating section, wherein the moving image component image selecting section selects a plurality of moving image component images in which the object areas identified by the object area identifying section are not in positions that overlap with one another from among the plurality of moving image component images included in a moving image of a first period in the moving image received by the moving image acquiring section, the image generating section generates a single synthesized image by superimposing the images that include the plurality of object areas included in each moving image component image in the plurality of moving image component images selected by the moving image component image selecting section, the output section outputs the single synthesized image generated by the image generating section as the image representing the moving image of the first period instead of the plurality of moving image component images included in the moving image of the first period, the moving image component image selecting section selects a first group of moving image component images in which the object areas identified by the object area identifying section are not in positions that overlap with one another from among the plurality of moving image component images included in the moving image of the first period in the moving image acquired by the moving image acquiring section and selects a second group of moving image component images in which the object areas identified by the object area identifying section are not in positions that overlap with one another from among at least a portion of the moving image component images in the plurality of moving image component images included in the moving image of the first period and from among the plurality of moving image component images included in the moving image of a second period that follows the first period, the image generating section generates a first synthesized image by superimposing the images that include the plurality of object areas included in each moving image component image of the first group and generates a second synthesized image by superimposing the images that include the plurality of object areas included in each moving image component image of the second group, and the output section outputs the first synthesized image and the second synthesized image generated by the image generating section as the images representing the moving images of the first period and the second period, respectively, instead of the plurality of moving image component images included in the moving images of the first period and the second period.

16. The non-transitory computer readable medium according to claim 15, causing an output apparatus that outputs an image to further function as:
a moving direction identifying section that identifies a direction in which the object extracted by the moving object extracting section moves in the moving image received by the moving image acquiring section; and
a period identifying section that identifies a period in which an amount of change in a direction identified by the moving direction identifying section is less than a predetermined amount of change in the moving image received by the moving image acquiring section, wherein the moving image component image selecting section selects a plurality of moving image component images in which the object areas identified by the object area identifying section are not in positions that overlap with one another from among the plurality of moving image component images that represent a moving image of the period identified by the period identifying section.

17. The non-transitory computer readable medium according to claim 15, causing an output apparatus that outputs an image to further function as:
a period identifying section that identifies a period in which time intervals between moving image component images that include the object areas that do not overlap with each other are shorter than predetermined durations in the moving image received by the moving image acquiring section, wherein the moving image component image selecting section selects a plurality of moving image component images in which the object areas identified by the object area identifying section are not in positions that overlap with one another from among the plurality of moving image component images that represent a moving image of the period identified by the period identifying section.

18. The non-transitory computer readable medium according to claim 15, causing an output apparatus that outputs an image to further function as:
a condition storing section that stores a condition concerning objects to be extracted from the moving image; and
an object identifying section that identifies objects to which the condition stored by the condition storing section is applicable, wherein the moving object extracting section extracts the moving object in the moving image from among the objects identified by the object identifying section.

19. The non-transitory computer readable medium according to claim 18, wherein
the condition storing section stores a condition relating to a shape of the object to be extracted from the moving image, and
the object identifying section identifies objects to which the condition relating to the shape stored by the condition storing section is applicable.

20. The non-transitory computer readable medium according to claim 18, wherein
the condition storing section stores a condition relating to a position of the object to be extracted from the moving image, and
the object identifying section identifies objects to which the condition relating to the position stored by the condition storing section is applicable.

* * * * *